United States Patent [19]

Bonnier et al.

[11] Patent Number: 5,709,400
[45] Date of Patent: Jan. 20, 1998

[54] FOLDING ASSEMBLY FOR THE SUPPORT OR TRANSPORTATION OF A PERSON

[75] Inventors: Michel Bonnier, Trevoux; Georges Bonnier, Villeurbanne; André Taillard, Chessy-les-Mines, all of France

[73] Assignee: MGB, Trevoux, France

[21] Appl. No.: 491,996

[22] PCT Filed: Jan. 19, 1994

[86] PCT No.: PCT/FR94/00064

§ 371 Date: Aug. 10, 1995

§ 102(e) Date: Aug. 10, 1995

[87] PCT Pub. No.: WO94/16928

PCT Pub. Date: Aug. 4, 1994

[30] Foreign Application Priority Data

Jan. 20, 1993 [FR] France ................ 93 00697
Aug. 6, 1993 [FR] France ................ 93 00926
Aug. 24, 1993 [FR] France ................ 93 10338

[51] Int. Cl.$^6$ ........................................ B62B 7/00
[52] U.S. Cl. ................... 280/650; 280/655; 280/47.38
[58] Field of Search ........................... 280/642, 643, 280/647, 650, 655, 655.1, 658, 47.371, 47.38, 47.39, 47.41

[56] References Cited

U.S. PATENT DOCUMENTS

| 3,550,998 | 12/1970 | Boudreau | 280/650 |
| 4,354,689 | 10/1982 | Perego | 280/47.371 |
| 4,856,809 | 8/1989 | Kohus et al. | 280/658 |
| 5,234,224 | 8/1993 | Kim | 280/650 |
| 5,398,951 | 3/1995 | Ryu | 280/643 |
| 5,524,503 | 6/1996 | Ishikura | 280/642 |

FOREIGN PATENT DOCUMENTS

| 422812 | 4/1991 | European Pat. Off. | 280/642 |
| 9102763 | 5/1991 | Germany . | |
| 1176516 | 1/1970 | United Kingdom . | |
| 1176517 | 1/1970 | United Kingdom . | |
| 2254587 | 10/1992 | United Kingdom | 280/47.38 |
| 86/03464 | 6/1986 | WIPO . | |

Primary Examiner—Brian L. Johnson
Assistant Examiner—Frank Vanaman
Attorney, Agent, or Firm—Oliff & Berridge, PLC

[57] ABSTRACT

A folding and height adjustable assembly for supporting or transporting an individual or a child includes a bearing or rolling structure with two beams and a structure for carrying a support for the individual or child. The carrying structure can be hinged at its base and can occupy a storage position wherein uprights are substantially parallel to the beams, and an operating position wherein the uprights form an acute angle with respect to the beams. The support for the person is fixed between two branches of a guiding handle. A height locking mechanism is located between at least one upright of the carrying structure and a branch of the guiding handle and locks the branch in at least two predetermined positions.

15 Claims, 6 Drawing Sheets

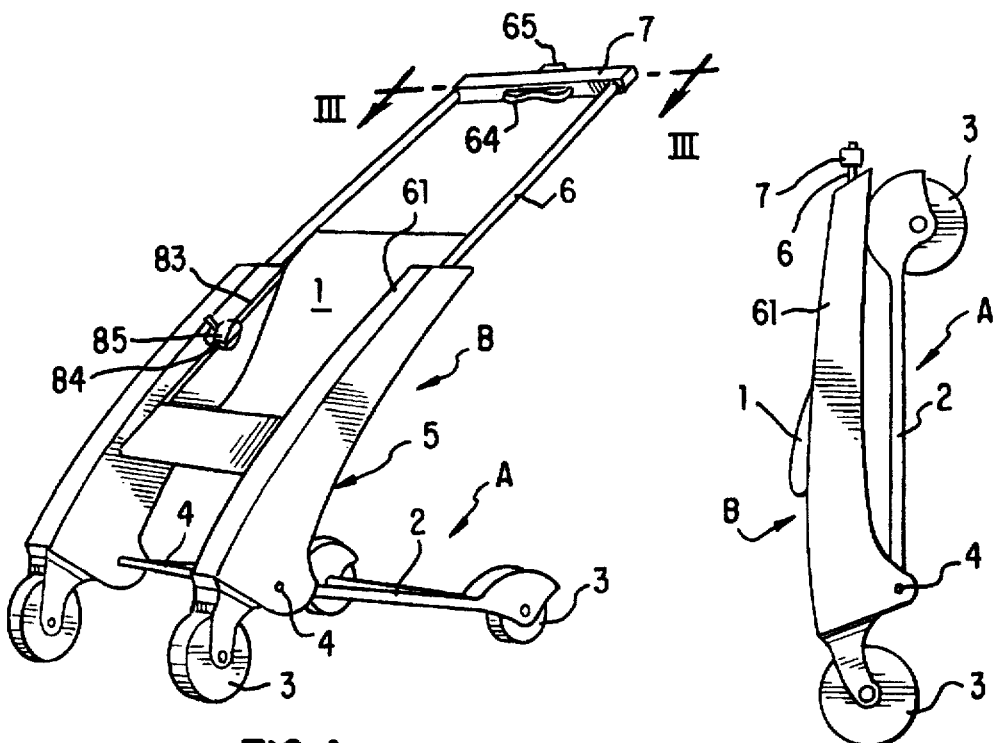
FIG. 1
FIG. 2
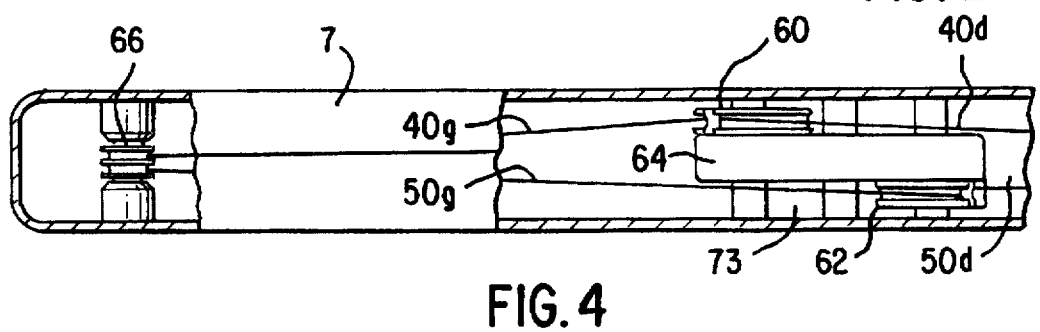
FIG. 4
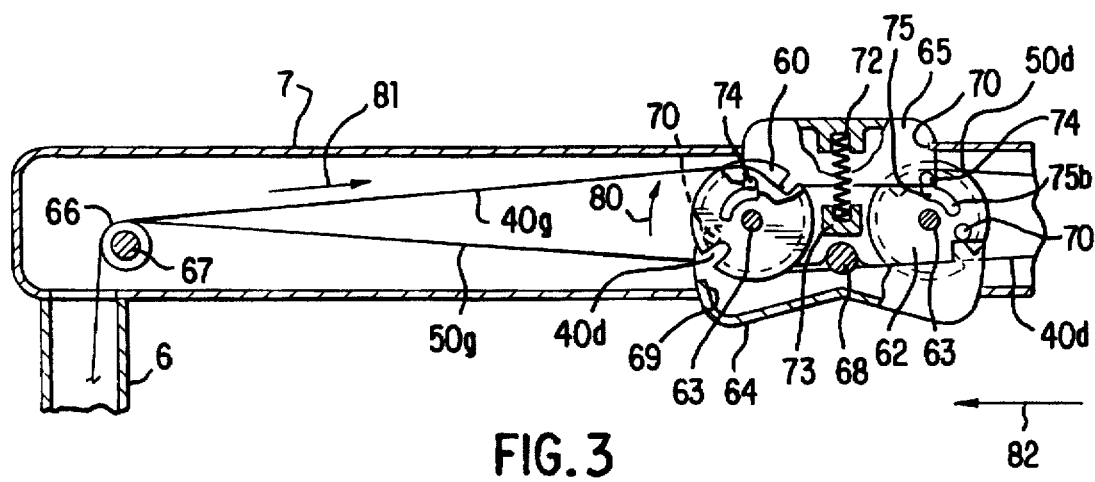
FIG. 3

FOLDING ASSEMBLY FOR THE SUPPORT OR TRANSPORTATION OF A PERSON

BACKGROUND OF THE INVENTION

The present invention relates in general to a folding assembly for supporting an individual, and for example a vehicle for transporting a child, capable of being unfolded into a configuration of use, for example into a rolling configuration in which it may, for example, be pushed by an accompanying individual, and of being folded up into a storage or transport configuration. The invention relates particularly, but not exclusively, to a folding vehicle for transporting a child, regardless of whether this is a stroller or a baby carriage for example; it being understood that the present invention may be applied, on the one hand, to other folding vehicles such as a wheelchair for the disabled, and, on the other hand, to other folding assemblies, such as indoor chair or garden chair.

DESCRIPTION OF THE PRIOR ART

WO 86/03464 already discloses a folding assembly composed:
- of a bearing or rolling structure with two longitudinal members,
- of a structure for carping the support for the individual, and for example the seat or cradle, this structure including two upright members articulated at their base to the ends of the longitudinal members and able to occupy a storage position in which these upright members are substantially parallel to the longitudinal members, and a position of use in which they form an acute angle with respect to the longitudinal members,
- of means for immobilizing the two structures in each of their two positions,
- and of a guiding handle, the branches of which are mounted so that they can slide with respect to the upright members of the carrying structure.

In this folding assembly, the support for the individual is fastened permanently to the upright members of the carrying structure so that in the position of use this support is situated a constant height above the ground whereas for young child it is preferable for the recumbent sleeping position to be lower than the seated position, even if only to improve the stability of the assembly by lowering its center of gravity.

Moreover, when the folding assembly is brought into the storage configuration, the fixed position of the support for the individual on the carrying structure, even if this support is a folding support, forms an protuberance which increases the lengthwise bulk at one of the ends of the folded assembly and does not favor the storing of this assembly.

To this should be added the fact that the numerous manipulations required to change from one configuration to the other render these conversions difficult and sometimes dangerous for one's fingers.

SUMMARY OF THE INVENTION

The object of the present invention is to overcome these drawbacks by supplying a folding assembly of the aforementioned type, making it possible to modify the distance relative to the ground of the support for the individual or child, to reduce the number of manipulations required for changing configuration, while lowering the manufacturing cost.

To this end, in the folding assembly according to the invention, the support for the individual is fixed between and onto the two branches of the guiding handle, while a mechanism for locking the height, in at least two predetermined positions of said support in its use configuration, is interposed between at least one upright member of the carrying structure and the corresponding branch of the guiding handle.

By virtue of this arrangement, when the assembly is in the configuration of use, the support for the individual, and for example the seat, may occupy at least two positions, namely a high, seated, position and a low position for lying down. Depending on the number of positions allowed by the immobilization mechanism, this low position may be the same as or different than the position occupied by the support for the individual when the assembly is in the storage configuration.

In one embodiment of the invention, the means for angular immobilization of the two structures comprise, at least on one side of the structures:
- a cross-bracing lever, the lower end of which is articulated to the corresponding longitudinal member of the bearing or rolling structure, and is associated with elastic return means, and the upper end of which is secured to a transverse pin mounted so that it can slide in a longitudinal slot of the corresponding upright member,
- and a locking device with a reversible hinge joint, composed of two levers located in the extension of one another close to the aforementioned slot, each of these levers on the one hand being articulated to the corresponding upright member of the carrying structure beyond the corresponding end of the slot and, on the other hand, being articulated with respect to the other lever by means of a sliding joint formed of a peg sliding in a slot and, in addition, including a notch for immobilizing the upper pin of the cross-bracing lever in one or other of its storage or use positions.

This device, employing simple, inexpensive, and reliable means makes it possible to obtain excellent angular immobilization of the two structures in each of their configurations.

Advantageously, the branches of the handle are each secured to a lower slide which can slide on a slideway of the carrying structure, this slide carrying, articulated to it:
- on the one hand, a first lever for positioning the branches, one of the ends of which is shaped into a locking bolt and can penetrate either one of the recesses made in the corresponding upright member of the carrying structure, the other end of said lever bearing on a return spring intending to keep it in the immobilizing position, and being connected by a flexible link to operating means located on the transverse bar of the handle,
- and, on the other hand, a second lever for unlocking the folding-unfolding function, one of the ends of which is connected, by a flexible link, to operating means located on the transverse bar of the handle, the other end of this lever being able to come into contact with a step projecting laterally from one of the levers of the reversible hinge joint for locking the folding/unfolding function in order to bring this hinge joint into an unlocked position.

With this arrangement, the two operations, respectively of locking the angular setting of the two structures and of unlocking the positioning of the branches of the handle and of the support for the individual are centralized on the transverse bar of the handle, this respectively facilitating the procedure of heightwise adjustment of the support, seat, or cradle, and the procedure of folding or unfolding.

Another advantage of this arrangement stems from the fact that the second lever, for unlocking the folding/unfolding function, is located on the slide, this allowing it to be operative only in the position in which it is close to the hinge joint, that is to say only when the upright members of the handle are retracted into those of the carrying structure. This simple arrangement prevents inappropriate manipulations and avoids having to provide additional safety means.

In a preferred embodiment of the invention, each of the branches of the handle is secured to a tubular cross member forming a handle, and including operating means composed of:

two independent pulleys located side by side and mounted so that they are free to rotate about a longitudinal axis and to each of which are fastened the ends of the flexible links coming, in the case of one of them, from the first levers and, in the case of the other, from the second levers, a rocker lever articulated between the two pulleys about a longitudinal axis, and each of the ends of which is able to cause the corresponding pulley to pivot through a fraction of a turn, and an unlockable means for rotationally immobilizing these pulleys.

With this device, in order to operate one or other of the functions, all that is required is firstly to bring the means for rotationally immobilizing the pulleys into an unlocked position, then to rock the rocking lever in one direction in order to unlock the upright members of the handle with respect to those of the carrying structure and, in the other direction, in order to unlock the means immobilizing the carrying structure with respect to the rolling structure.

In one embodiment, the support for the individual is connected to each of the branches of the handle with the interposition of a member for adjusting the orientation of the said support, said member being equipped with means for locking in each of its angular positions.

Such a member improves the comfort of the user but also, in the storage configuration, allows the support, seat or cradle to be given an orientation that reduces the bulk of the assembly.

In another embodiment, the support for the individual is connected to each of the branches of the handle with interposition of a removable fastening means comprising:

on one of the elements, leg or support, a fastening body with a slideway of C-shaped section, which is blind and opens upward, on the other element, a fastening component with a tenon having a T-shaped transverse section able to penetrate the C-shaped slideway, and means for locking the tenon in the slideway at the end of the engagement travel.

This assembly device allows instantaneous fitting and removal of the support, seat or cradle, moreover without the use of tools. That makes it possible to replace one support with another rapidly, and also to turn the support round so that the user can face forward or backward, with respect to the direction of travel of the assembly and, above all, to remove the support from the carrying structure in order to reduce the bulk of the assembly in its storage configuration.

One embodiment of this assembly combines orientational adjustment and removability of the support with respect to the carrying structure.

BRIEF DESCRIPTION OF THE DRAWINGS

Other features and advantages will emerge from the description which follows with reference to the appended diagrammatic drawing representing, by way of non-limiting example, one embodiment of the invention in the case of its application to a stroller for a child.

FIG. 1 is a perspective view of the stroller as a whole, when it is in the rolling position, FIG. 2 is a side view, when it is in the storage position, FIG. 3 is a partial section on III—III of FIG. 1 showing the operating means, FIG. 4 is a partial plan view with partial section through the handle, showing the operating means.

DESCRIPTION OF THE PREFERRED EMBODIMENTS

Figure 5:
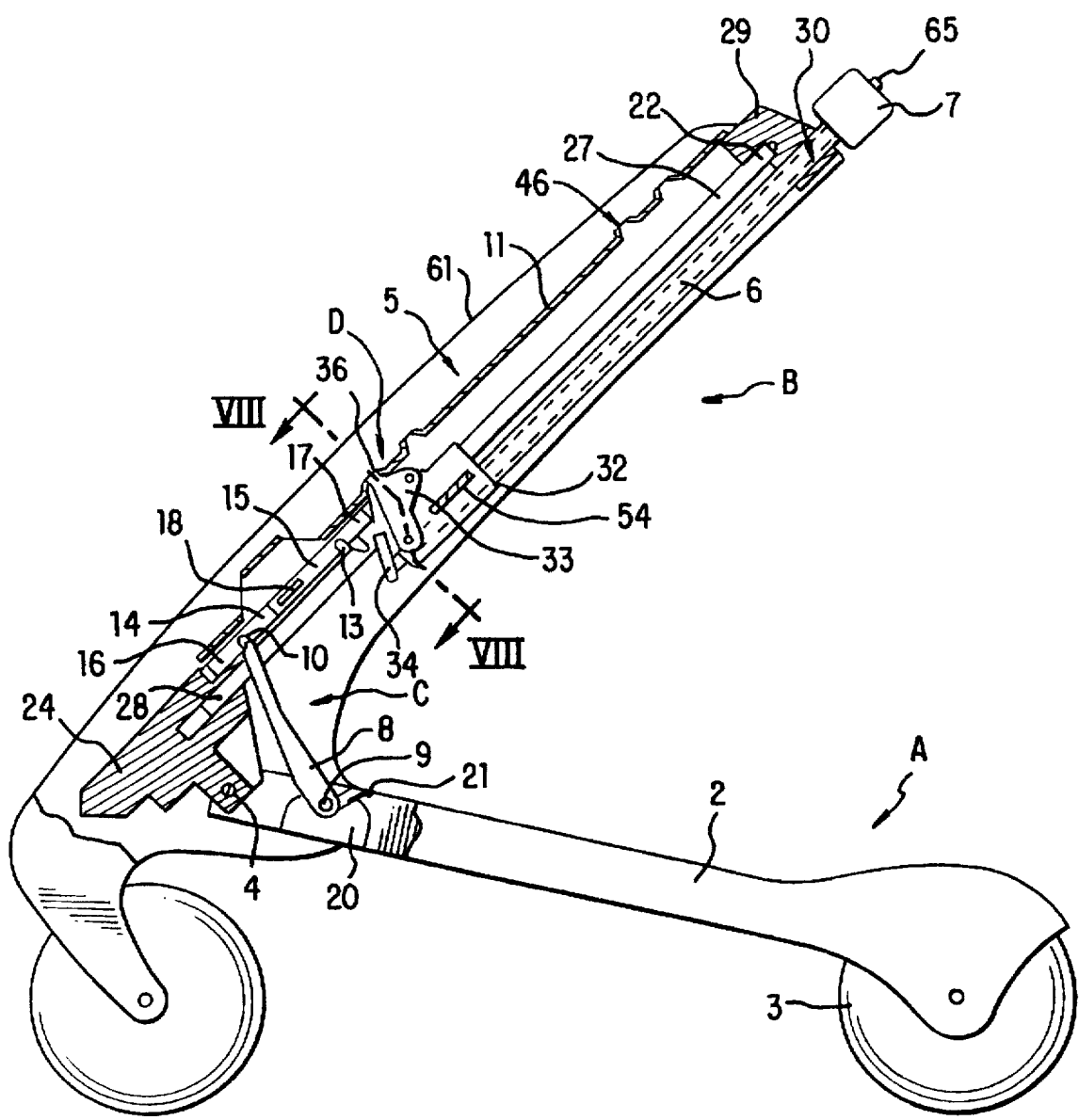
FIG. 5 is a side view in transverse section of the stroller when it is in the rolling position with the upright members of the handle in position, completely retracted.

As shown in FIG. 1, this stroller is composed of a rolling structure denoted, in a general fashion, by the reference A, and of a carrying structure denoted by the reference B. The rolling structure is composed of two longitudinal members 2 carrying wheels 3 and articulated about a transverse axle 4 at the base of the carrying structure B. The latter is composed of two upright members 5 carrying the two branches 6 of a guiding handle 7. At least one, and preferably each, of the upright members 5 of the carrying structure B is connected to the corresponding arm 2 of the rolling structure by an immobilizing mechanism C (FIG. 5).

Figure 6:
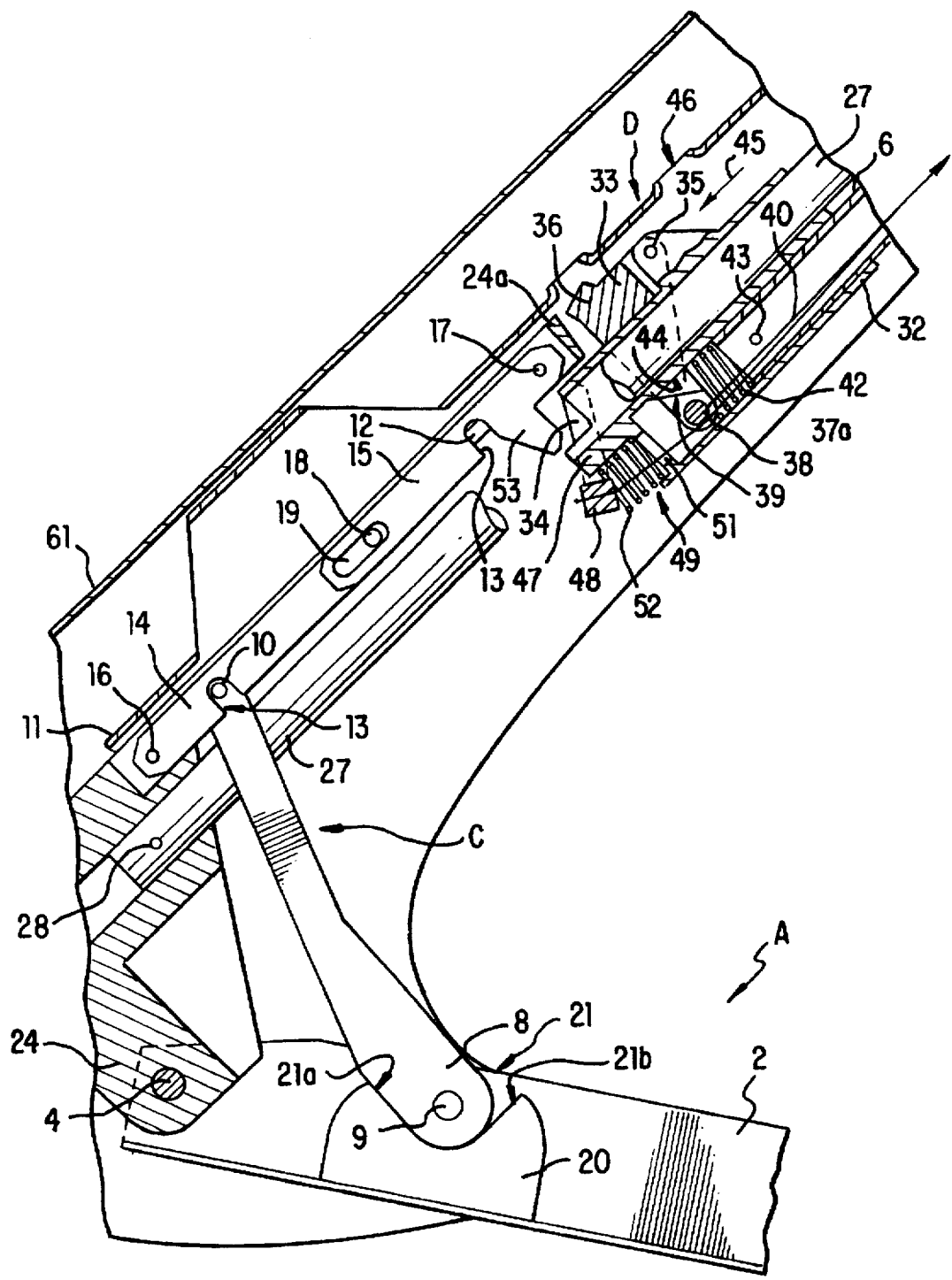
FIGS. 6 and 7 are partial sectional views of the lower part of the carrying structure when the handle is in the bottom position and, respectively, upon actuation of the bolt for locking the upright members and upon actuation of the lever for unlocking the hinge joint.
Figure 7:
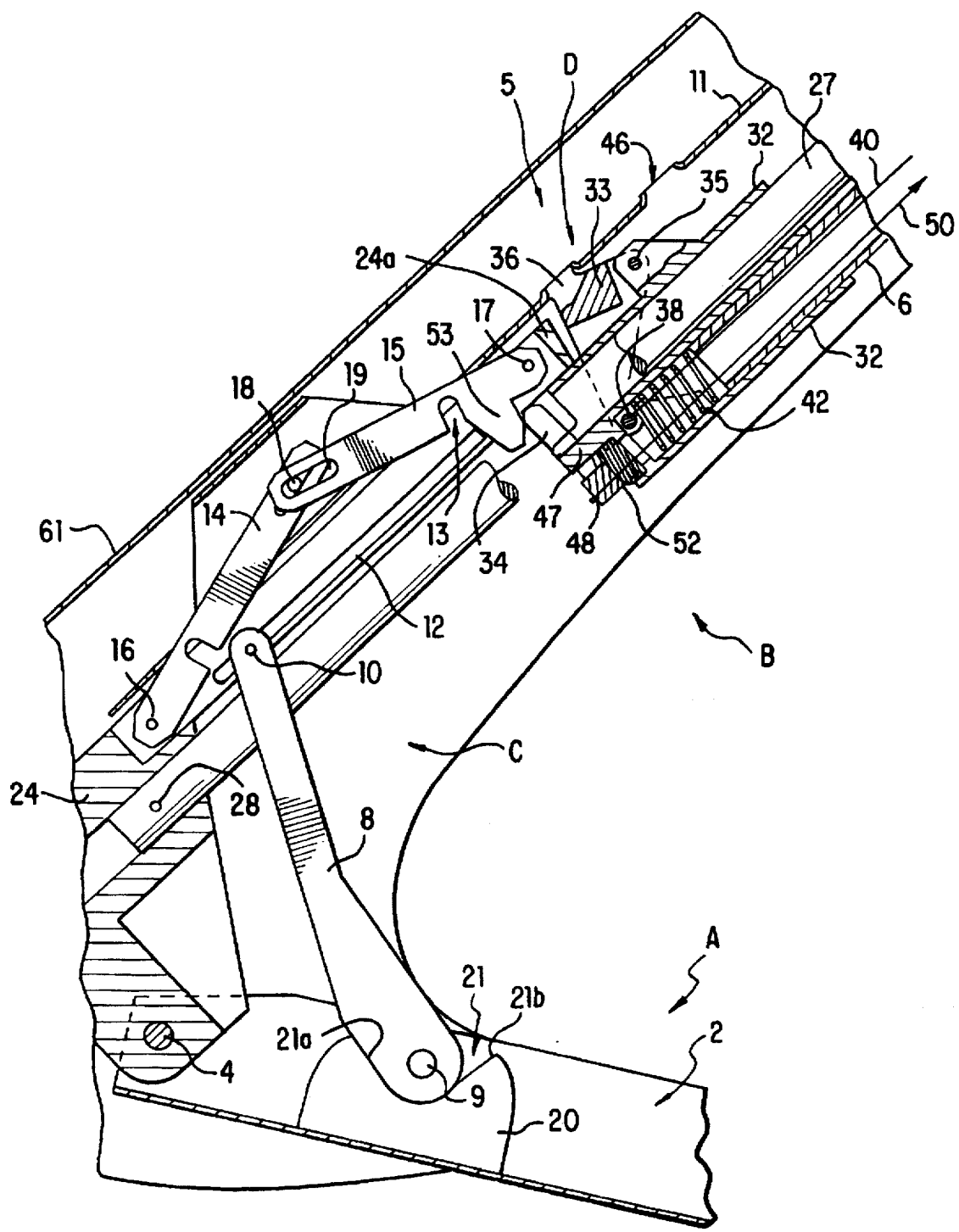

In the embodiment represented in FIG. 5, and in further detail in FIGS. 6 and 7, this mechanism comprises a cross-bracing lever 8, the lower end of which is articulated at 9 to the corresponding longitudinal member 2, and the upper end of which is equipped with a transverse pin 10. Part of this pin can slide in a longitudinal slot 12 (FIG. 7) formed in the articulation support 24a described later, while its other part is intended to interact with one or other of the notches 13 made in the two levers, respectively 14 and 15, of a reversible hinge joint. The lever 14 of this hinge joint is articulated at 16 to the support 24a below the end of the slot 12, while the lever 15 is articulated via one of its ends at 17 to the same support, but above the end of the slot 12. The lever 14 has a peg 18 which can slide in a slot 19 made at the free end of lever 15.

The immobilization mechanism also includes means for returning the cross-bracing lever 8, which consist, in this embodiment, of a block 20 of elastic material fastened into the longitudinal member 2 above the articulation 9. A housing 21 formed in this block has two bearing faces 21a and 21b able to come into contact with the corresponding parts of the lever at the end of the folding or unfolding movement in order locally to compress the block and generate elastic return forces tending to cause the lever 8 to pivot at the beginning of each of the unlocking phases, in order to begin to open the reversible hinge joint 14, 15.

FIG. 6 shows that when the stroller is in the configuration of use, the pin 10 of the cross-bracing lever 8 is immobilized in the lower notch 13 of the hinge joint and thus immobilizes at an acute angle the compasses formed by the longitudinal member 2 of the rolling structure A and by the upright member 5 of the carrying structure B.

FIG. 7. shows that when the stroller is folded in order to bring it into the storage configuration, represented in FIG. 2, the hinge joint 14-15 releases the pin 10, which can thus slide in the slot 12 until it comes below the upper notch 13 and then enters this notch, in which position the corresponding longitudinal member 2 is substantially parallel to the overall direction of the carrying structure, as shown in FIG. 2.

Figure 8:
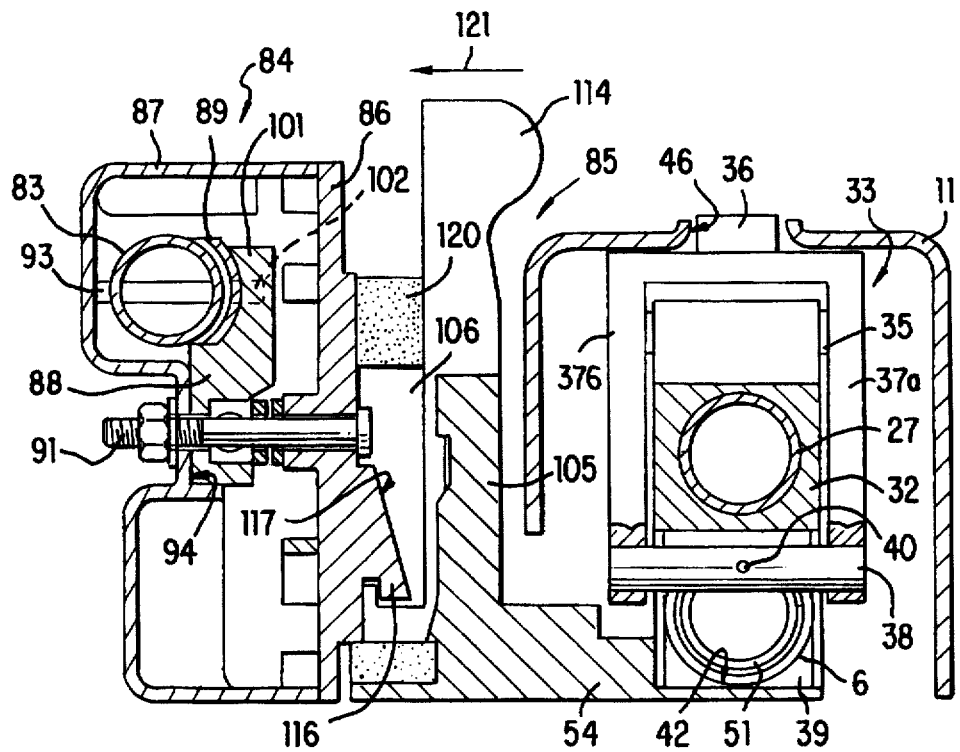
FIG. 8 is a section on VIII—VIII of FIG. 5 showing, on a larger scale, the slide secured to one of the upright members of the handle.

The framework element 11 of each upright member 5 is produced from a rigid component which, made of metal or a molded material and as shown in FIG. 8, has, in transverse section, the overall shape of a U, the concavity of which points downward. At its lower end, and as shown in FIG. 5, this framework element is secured to a yoke 24 which is made of synthetic material and constitutes an articulation bearing for the pin 4 for articulation of the two structures A-B, but also an articulation support 24a for the reversible hinge joint 14-15, as FIGS. 6 and 7 show, and as an anchoring shank for the lower end of a vertical slideway 27.

In the embodiment represented, this slideway consists of a metal tube which is connected to the yoke 24 by a transverse pin 28.

As FIG. 5 shows, the upper end of the framework element 11 is secured to an upper yoke 29, also made of synthetic material and forming an anchoring shank for the other end of the slideway 27, immobilized by a pin 22, and a bearing 30 for the corresponding branch 6 of the handle 7.

Each of the branches 6 is secured, at its lower end, to a slide 32 mounted so that it can slide on the slideway 27 and carrying a first lever 33 forming part of a mechanism D for locking in terms of height, and a second lever 34. As FIGS. 6 to 8 show in more detail, the first lever 33 is articulated to the slide 32 by a transverse pin 35 and, in its upper part, has a tenon 36 forming a locking bolt. In its lower part, it has the shape of a clevis, the two branches 37a–37b (FIG. 8) of which are located on either side of the slide 32. These two branches carry a transverse pin 38 which passes through the slide 32 via a slot 39 visible in FIGS. 6 and 7. This pin serves as an anchoring point for the lower end of a flexible link 40, located longitudinally in the branch 6, and as a point against which a spring 42 can bear, the other end of which spring bears against the end of the branch 6 connected to the slide by a pin 43. The spring 42 which is located in the housing 44 made in the slide in order to accommodate the lower end of the branch 6, imparts to the first lever 33 a force in the direction of the arrow 45. This force tends constantly to engage the bolt-shaped part 36 of the lever in one of the recesses 46 made in the web of the framework element 11.

The second lever 34, carried by the slide 32, is located on one side of the slide. It is articulated to the latter by a transverse pin 47 and is secured via one of its ends to a transverse spur 48 extending in front of the slide. More precisely, and as shown in FIGS. 6 and 7, this spur extends in front of a counterbore 49 communicating, via a transitional bore 51, with the housing 44 made in the slide. This spur 48 constitutes a fastening member for a flexible link 50 passing through the aforementioned bores an going towards the inside of the branch 6. A spring 52 located in the counterbore 49 comes to bear on the spur 48 in order to keep the entire lever in an inactive position, in which it is pivoted in order to remain the inside the bulk of the slide 32, as shown in FIG. 6. This same figure shows that when the slide is in the lowermost position, the path of the free end of the second lever 34 can run secant to a step 53 projecting from the lever 15 of the hinge joint, and the usefulness of which will be specified later.

FIG. 8 shows that the slide 32 is secured to a transverse tab 54 on which the means for fastening and articulating the seat i carried by the carrying structure B are fastened. These means will be described later.

FIGS. 1 and 2 show that the framework element 11 of each of the upright members of the carrying structure B is covered by a cap 61 concealing all the mechanisms which have just been described, respectively for immobilizing the branches 6 in the carrying structure B and immobilizing the carrying structure B with respect to the rolling structure A.

According to another feature of the invention, the flexible links 40 and 50 associated with the aforementioned immobilizing means end at the operating means located in the transverse bar 7 forming a handle, which means will be described with reference to FIGS. 3 and 4.

FIG. 3 shows that the handle 7 consists of a tubular cross member which communicates with the inside of the ends of the tubular branches 6 to which it is attached. In its central part, this cross member therefore carries operating means which are composed of two pulleys 60 and 62 mounted so that they can rotate freely on transverse pins 63, of a rocking lever 64 and of a safety push-button 65. Fastened to the pulleys 60 are the ends of the flexible links 40g and 40d coming, respectively, from the left-hand upright member and from the right-hand upright member of the carrying structure B, and of bringing about the unlocking of the branches. To the pulley 62 are fastened the links 50g and 50d coming from the same upright members, but bringing about the folding/unfolding function. A transmission element, for example a roller 66 mounted to rotate freely on a transverse pin 67 is located close to the mouth of each branch 6 in each end of the cross member 7, to facilitate the transmission of the flexible links toward the pulley 60 and 62.

The rocking lever 64 is articulated about a transverse pin 68 of the cross member 7. It passes through the lower wall via an opening 69. Each of the ends of this lever is able to come to bear with an eccentric finger 70 projecting from one of the diametral faces of the corresponding pulley. FIG. 4 shows that the rocking lever is located in the gap between the pulleys 60–62, this implying that the finger 70 of each pulley projects toward the other pulley.

The safety push-button 65 is mounted so it can slide with respect to the cross member 7, the upper wall of which it passes through via an opening 70. A return spring 72, interposed between this safety button and a transverse board 73, tends to drive this safety pushbutton outwards. The safety push-button which, like the rocking lever 64, is located in the gap between the two pulleys includes, at each of its ends and projecting from one of its faces, two stubs 74 interacting with slots of each of the pulleys. Each slot is composed of a substantially radial branch 75a, by virtue of which the stub 74 translationally immobilizes this pulley, and of a branch 75b, in the shape of a circular arc, allowing rotation of this pulley.

When the operating mechanism is at rest, it is in the position represented in FIG. 3, in which position the two pulleys 60, 62 are prevented from rotating by the stubs 74 of the safety push-button 65 and the rocking lever 64 is in the position of rest.

It will be noted that in this position of rest, the locking teeth 36 of the slides associated with each of the branches 6 are engaged in one of the recesses 46 of the framework element, as shown in FIG. 7, and are sounder the action of their return spring 42, while the levers 34 are, under the thrust of their spring 52, in their inactive position represented in FIG. 6.

When it is necessary to change the vertical position of the seat 1, shown in FIG. 1, or to bring the handle into the storage position shown in FIG. 5, all that is required is to actuate the safety push-button 65, so as to shift its stubs 74 from the radial slots 75a into the circular arc-shaped slots 75b of the pulleys 60 and 62. At this stage, and with the same hand, all that is required is to rock the lever 64 in the direction of the arrow 80 of FIG. 3 in order, through contact of the end of this lever, which is to the left in FIG. 3, with the finger 70 of the pulley 60, to bring about the rotation of this pulley in the direction of this arrow 80. This rotation, which takes place over a fraction of a turn, imparts to the two flexible links 40g and 40d a translation in the direction of the arrows, respectively 81 and 82. This traction is relayed to the first levers 33 which, oscillating about their axes of articulation 35, change from the locked position represented in FIG. 7 to the unlocked position represented in FIG. 6.

It is then very easy, by continuing to actuate the two elements 64 and 65 of the operating mechanism, to telescope the branches 6 of the handle with respect to the upright members 5 of the carrying structure B as far as the chosen position, represented by the recesses 46 of the framework element 11.

As soon as the operating means are released, the rocking lever 64 returns to its initial position of rest under the action of the springs 42 located in the slides 32 and engaging the bolts 36 in the recesses 46 of the framework element. Indeed, the pivoting of the levers 33 is transmitted, via the links 40g and 40d, to the pulley 60 which thus returns to its initial position, allowing the stub 74 to engage in the radial branch 75a of its slot.

Rocking the lever 64 in the other direction, after actuation of the safety push-button 65, causes the flexible links 50g and 50d to be pulled, and, in consequence, causes pivoting of the levers 34, the free ends of which describe a path during which they encounter the steps 53 of the levers 15 of the hinge joints. The travel of the levers 34 is sufficient to bring the levers 14 and 15, constituting the hinge joints, from the locked position represented in FIG. 6 into the unlocked position represented in FIG. 7. In this last position, the notch 13 of the lever 14 releases the finger 10 of the cross-bracing lever 8, which can then pivot freely at the same time as the carrying structure B is moved closer to the rolling structure A.

At the end of movement, that is to say when the aforementioned two structures A and B are in the storage position, the finger 10 of each cross-bracing lever 8 meets the other part of the step 53 and, by the lever 15 pivoting in the opposite direction, brings this lever into alignment with the lever 14 and makes its notch 13 engage over the pin 10.

It will be noted that, starting from the moment when the finger 10 is running in the slot 12, action on the rocker lever 64 may cease.

As before, the rocker lever 64 is returned to its middle position by the return springs 52 of the levers 34.

The mechanism for unlocking the means for immobilizing the two structures A and B of the stroller in the folded or unfolded position, affords the advantage of being operative only when the branches 6 of the handle 7 are in the fully telescoped position, that is to say are in the storage position. In fact, in the other positions, pivoting of the second lever 34 is completely inoperative, because it is too far away from the step with which it interacts. This arrangement avoids having recourse to additional safety means for preventing accidental folding of the stroller when it is in the position of use.

It will be noted that the immobilizing mechanism D operates equally well in the storage configuration and in the configuration of use, and that unlocking thereof takes place, in both cases, from the handle 7.

The description of the means for fastening the support for the individual, and in this case the seat 1, onto the tabs 54 secured to the slides 32 will now be given. In actual fact, these fastening means contribute not only to improving comfort for the user, but also play a part in reducing the bulk of the stroller when it is in the storage configuration.

In the embodiment represented, each of the longitudinal members 83 of the framework element for the support of the individual, and in this case the seat 1, is connected to the tab 54 with the interposition, on the one hand, with a member for adjusting angular orientation denoted overall by the reference 84 and, on the other hand, a means for removable fastening denoted overall by the reference 85.

Figure 9:
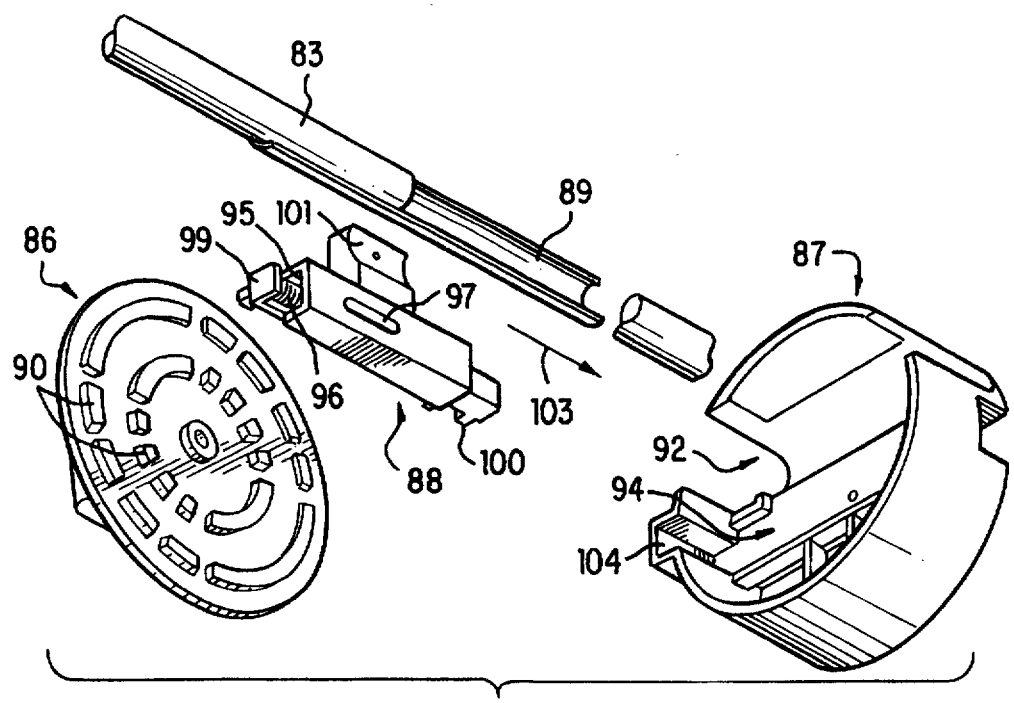
FIG. 9 is an exploded perspective view showing the components of one embodiment of the member for adjusting the angular orientation of the support for the individual, or seat.
Figure 10:
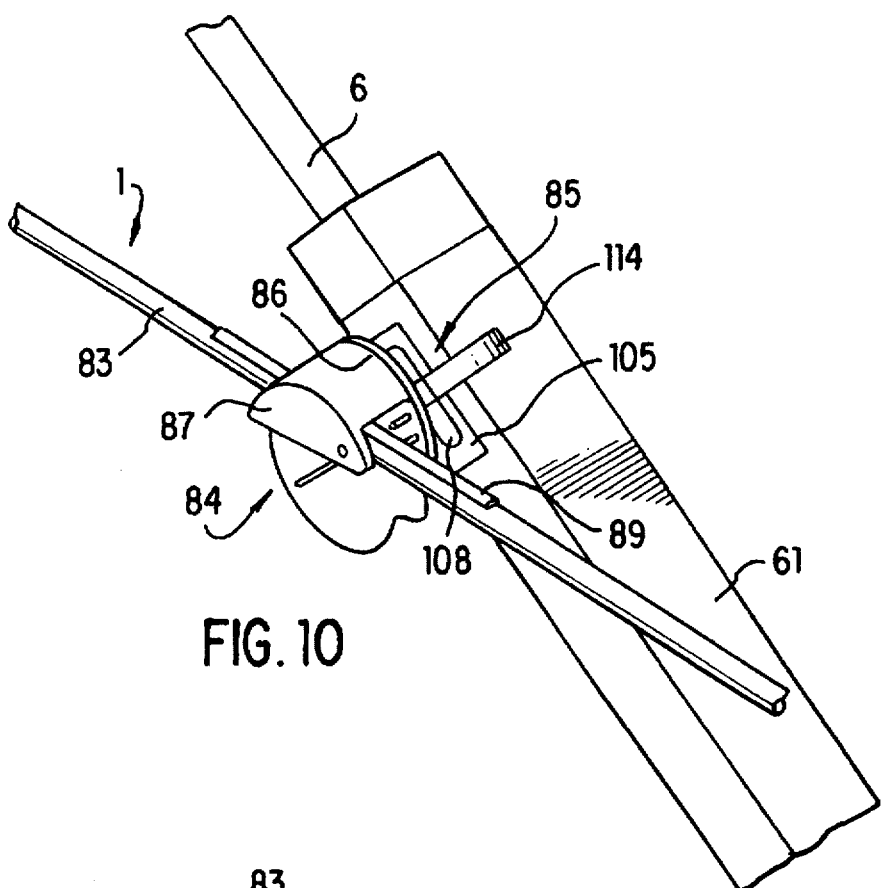
FIG. 10 is a part perspective view of one embodiment of the means for removably fastening the support for the individual to the carrying framework when this means is combined with the adjustment member of FIG. 9.

The member 84 for orientational adjustment is, as shown in FIGS. 8 and 9, composed of a disk 86, of a casing 87, of a runner 88 and of an operating button 89. The disk 86 is secured, via means which will be described subsequently, to the branch 6 of the handle, and includes, projecting inward, at least one and preferably two toothed rings 90. FIG. 9 shows that the gaps between teeth of the two rings are aligned across the diameters.

The casing 87 caps the disk 86 with respect to which it is mounted so that it can rotate freely about a transverse pin 91 arranged axially to the center of the disk. This casing has a slot 92 passing through it parallel to one of its diameters and allowing it to have the longitudinal member 83 of the framework of the seat passing through it, to which longitudinal member it is fastened by screws 93. This casing is made of a molded synthetic material and internally includes a diametral housing 94 arranged parallel to the slot 92 and serving as a slideway for the runner 88.

As FIG. 9 shows, the runner 88 includes an internal housing 95 for a return spring 96. Two of the walls of this housing have a longitudinal slot 97 passing through them, serving for the passage of the pin 91, while allowing the runner to slide in the housing 94 of the casing. The spring 96 comes to bear, on the one hand, on the pin 91 and, on the other hand, on a bent back return 99, secured to the runner and coming into the extension of the mouth of its internal housing 95. This runner also includes fingers 100 projecting from its face opposite the toothed rings 90. These fingers are distributed so that, when the runner is in the locked position, under the return action of its spring 96, each one of them is in one of the gaps between teeth of the rings 90. Finally, the runner 88 is secured to a transverse tenon 101 projecting into the region of the casing that includes the slot 92. This tenon is close to the longitudinal member 83 of the framework of the seat and allows the runner to be fastened, by a screw 102, to the pushbutton 89 for causing unlocking. In the embodiment represented, this push-button consists of a length of semicircular tube which can slide along the longitudinal member 83 of the framework element of the seat but it is obvious that it may exhibit any other form, provided that at least one of its ends, extending outside of the casing, is easily accessible to the user.

In the locked position, the fingers 100 of the runner 88 are engaged in the gaps between teeth of the toothed rings 90 and therefore rotationally mobilize the runner 88 and, by the fact that this runner is mounted in the housing 94 of the casing, rotationally immobilize the casing, and therefore the seat i with respect to the carrying structure B. In order to alter the angular position of the framework of the seat, all that is required is, by means of the push-button 89, to cause each of the runners 88 to slide in the direction of the arrow 103 of FIG. 9. This travel compresses the spring 96 and brings the fingers 100 out of the toothed rings 90. It is then possible to pivot the framework of the seat manually in order to give it the desired angular setting. As soon as this is reached, releasing the pushbuttons 89 allows the springs 96 to press the fingers 100 of the runners 88 against the corresponding toothed rings and to engage these fingers in a gap between teeth in order to provide the angular locking of the seat with respect to the carrying framework.

It will be noted that, in order to facilitate the sliding of the runner, the casing 87 includes a depression 104 in the extension of the housing 94.

This member for adjusting the orientation of the support for the individual is also used during the maneuver of placing the stroller in the storage configuration in order to give the support for the individual, for example the seat or the cradle, the angular position which, with respect to the carrying framework reduces as far as possible the bulk of this seat or cradle and, consequently, the overall bulk of the folding assembly.

Figure 11:
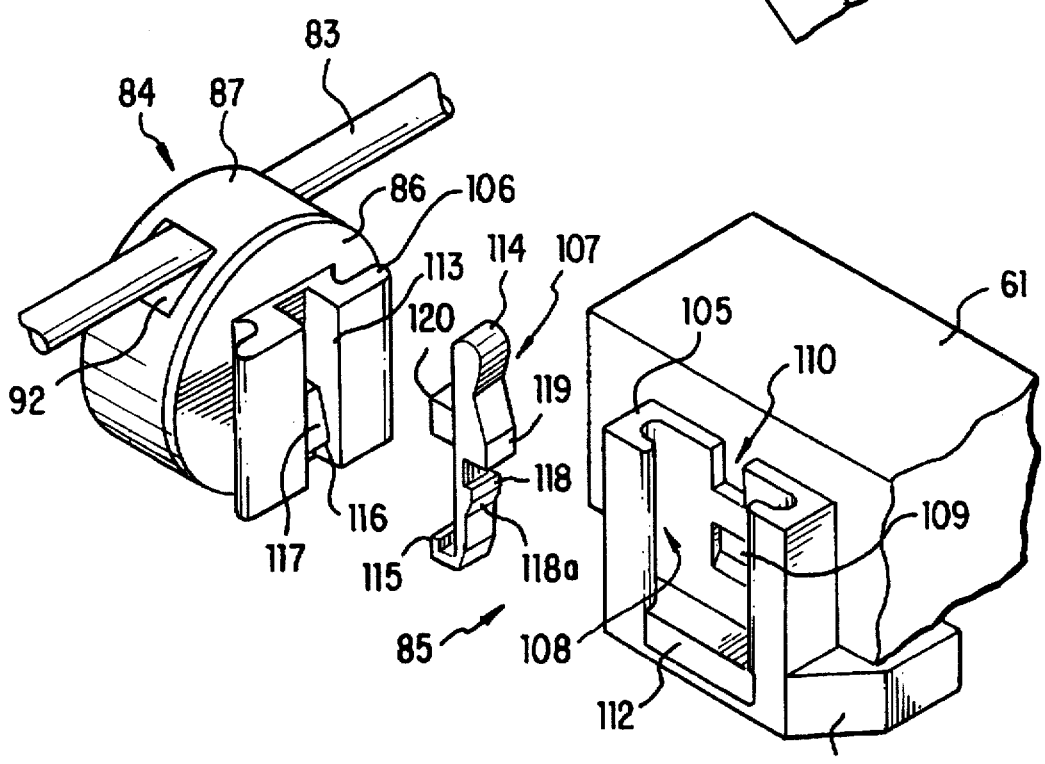
FIG. 11 is a perspective view showing the essential elements of the means for removably fastening the support for the individual.

The means for removable fastening 85 is composed, as shown in FIG. 11, of a fastening body 105, of a fastening component 106 and of a locking means 107. In the embodiment represented, the fastening body 105 is secured to the tab 54 forming part of the slide 32 secured to the branch 6 of the handle 7, while the component of the fastening 106 is secured to the disk 86 of the member 84 for adjusting orientation, but it is quite clear that they can be distributed in the opposite way.

FIG. 11 clearly shows that the fastening body 105 is essentially composed of a slideway 108 of C-shaped transverse section, blind downward, and open upward. In the embodiment represented, the longitudinal axis of the slideway is perpendicular to the tab 54, but it is quite clear that it may equally well be inclined with respect to this bracket. The bottom of the slideway has a locking orifice 109 and a recess 110 passing through it, which recess, offset longitudinally with respect to this orifice, emerges from the upper edge of the fastening body. Finally, a block of elastic material 112 is located in the blind bottom part of the slideway.

The fastening component 106 has a tenon of T-shaped transverse section able to penetrate the slideway 108. This tenon includes a longitudinal and axial recess 113 serving to house the lever 114 of the locking means 107. This lever is equipped at its lower end with a hook 115, open upward and articulated to a transverse boss 116 projecting from the bottom of the recess 113. FIG. 8 shows that this boss includes, facing the lever 114, a sloping face 117, facilitating the pivoting of the lever 114.

In its middle part, the lever 114 is equipped with a tooth 118, able to penetrate the locking orifice 109 and with a tooth 119 able to engage in the recess 110 of the fastening component 105.

The means for elastically returning the lever 114 consist of a block 120 of elastic material housed in the recess 113 of the tenon 106. This component is bonded onto the faces between which it is interposed, namely onto the bottom of the recess 113 and onto the face of the lever 114 opposite this bottom.

It emerges from the foregoing that the locking means composed of the lever 114 and of the elastic block 120 form an integral part of the fastening component 106, and consequently form an integral part with each of the longitudinal members of the framework 83 of the support for the individual, regardless as to whether the latter consists of a seat, a cradle or some other support.

In order to fit this seat, all that is required is to engage the fastening components 106 in the slideways 108 of the fastened bodies 105. During this engagement, the chamfers 118a preceding the teeth 118 of each of the levers 114 tend to cause the levers to pivot toward the fastening components 106 until the teeth 118 reach the locking orifices 109. From this position on, the levers 114 of the two removable fastening means return elastically to their locking position and engage the teeth 118 and 119 in their respective housings 109 and 110.

In order to take the assembly apart, all that is required is to cause the levers 114 to pivot inward in the direction of the arrow 121 of FIG. 8, compressing the elastic blocks 120 so as to separate the teeth 118 and 119 from their locking housings, and simultaneously to slide the fastening components 106 out of the slideways 108.

These removable fastening means, of simple design, allow rapid interchangeability of the support, seat or cradle with which the stroller is equipped, for example in order to change a seat from a position in which the child faces forward to a position in which it faces backward, with respect to the direction of travel of the stroller. This also makes it possible, when the support for the individual or child is very bulky and, for example, consists of a voluminous pod, to detach this support from the carrying assembly in order to reduce its bulk and make storage or stowing easier.

It emerges from the foregoing that the various means of which the folding assembly according to the invention is composed meet common goals, namely:

facilitating manipulations other than changes in configuration, reducing the bulk in the storage configuration, guaranteeing safety against any change in adjustment in the configuration of use, while being able to be manufactured at low cost.

We claim:

1. A folding and height-adjustable assembly for supporting or transporting an individual comprising:

a bearing structure with two longitudinal members, a support for the individual, a carrying structure for carrying the support for the individual including two upright members articulated at their base to ends of the longitudinal members, said carrying structure being articulatable between a storage position in which the upright members are substantially parallel to the longitudinal members, and an operating position in which the upright members form an acute angle with respect to the longitudinal members, an immobilization device which immobilizes the upright members and the longitudinal members in the storage position and the operating position, and a guiding handle having branches mounted so that they can slide with respect to the upright members of the carrying structure, wherein the support for the individual is fixed between the branches of the guiding handle, a mechanism for locking the support for the individual in at least two predetermined positions is interposed between at least one of said upright members of the carrying structure and one of said branches of the guiding handle, and an unlocking control mechanism located on the guiding handle for unlocking the support for the individual.

2. The folding assembly as claimed in claim 1, wherein the immobilization device comprises:

a cross-bracing lever having a lower end articulated to one of the longitudinal members of the bearing structure, said lower end connected to an elastic return mechanism, and an upper end secured to a transverse pin mounted so that the upper end can slide in a longitudinal slot in one of said upright members, and a locking device with a reversible hinge joint comprising two hinge levers, each of which is articulated to one of said upright members of the carrying structure and articulated with respect to the other hinge lever by a sliding joint comprising a slot formed in each of the hinge levers and a peg located in the slot, each of said hinge levers including a notch for immobilizing the upper transverse pin of the cross-bracing lever in one of said storage position and said operating position.

3. The assembly as claimed in claim 1, wherein the branches of the handle each includes a lower slide which can slide on a slideway of the carrying structure, a positioning lever for positioning the branches is articulated to the lower slide and has an end which is shaped into a locking bolt and can penetrate a recess in a corresponding upright member of the carrying structure, a second end of said positioning lever bearing on a return spring intending to keep the positioning lever in a storage position, and being connected by a first flexible link to an operating mechanism located on a transverse bar of the handle, and an unlocking lever for unlocking the immobilization device including one end of the unlocking lever connected, by a second flexible link, to the operating mechanism located on the transverse bar of the handle, a second end of the unlocking lever being able to come into contact with a step projecting laterally from a hinge lever of a reversible hinge joint in order to bring the reversible hinge joint into an unlocked position.

4. The assembly as claimed in claim 1, wherein each of the upright members of the carrying structure comprises a long metal framework element of U-shaped transverse section including recesses for a bolt for immobilizing one of the branches.

5. The assembly as claimed in claim 3, wherein the positioning lever comprises a clevis with two extensions passing on either side of the lower slide, carrying a flexible link pin which, passes through the lower slide via slots in the lower slide, and the flexible link pin is connected to the first flexible link and bears against a first return spring.

6. The assembly as claimed in claim 3, wherein the unlocking lever is articulated to one side of the lower slide and includes a transverse spur which serves as a bearing point for a second return spring, said unlocking lever being connected to the second flexible link.

7. The assembly as claimed in claim 3, wherein each of the branches of the handle is tubular, the lower slide includes a bore for accommodating one of said branches, and the assembly further includes a transitional bore and a counterbore, wherein a first return spring located within the counterbore acts to keep the positioning lever in an inactive position, the counterbore also forming a passage for the first and second flexible links.

8. The assembly as claimed in claim 3, wherein each of the branches of the handle is secured to a tubular cross member forming a grip portion, and wherein the operating mechanism comprises:

first and second independent pulleys located side by side and mounted on the handle so that they are free to rotate about a longitudinal axis, each of the first and second independent pulleys being attached to the first flexible link and the second flexible link respectively, of each of the branches, a rocker lever articulated between the first and second independent pulleys about a longitudinal axis, and each of the ends of which is able to cause corresponding one of the first and second independent pulleys to pivot through a fraction of a turn, and a pulley lock located on the handle for rotationally immobilizing the first and second independent pulleys.

9. The assembly as claimed in claim 8, wherein the pulley lock comprises a safety push-button which is mounted to slide transversely in the cross member against a safety push-button return spring, and wherein the safety push-button includes two stubs configured to penetrate a stub slot in a corresponding pulley, each stub slot having a radial branch for immobilizing the pulley, and a branch in the shape of a circular arc which allows rotation of the pulley.

10. The assembly as claimed in claim 8, wherein each of the first and second independent pulleys includes an eccentric finger projecting from one of its faces and located in a rocking path of one end of the rocker lever.

11. The folding assembly as claimed in claim 1, wherein the support for the individual is connected to each of the branches of the handle by an adjustment member which adjusts the orientation of the support for the individual, said adjustment member locking the support for the individual in a plurality of angular positions.

12. The folding assembly as claimed in claim 11, wherein the adjustment member comprises:

a disk secured to a corresponding branch of the guiding handle and including at least one toothed ring projecting toward the support for the individual, a casing covering the disk and rotationally mounted about a transverse pin passing axially through the disk, said casing being secured to the support for the individual and including an internal diametral housing, a runner mounted to slide in the diametral housing against a return device which biases the runner to a locked position, the runner including projecting fingers which mate with teeth of the toothed ring of the disk, and a push-button secured to the runner and extending beyond the casing for unlocking the support for the individual from the carrying structure.

13. The folding assembly as claimed in claim 1, wherein the support for the individual is connected to each of the branches of the handle by a removable fastening device comprising:

a fastening body with a slideway of C-shaped section connected to at least one of the support for the individual and one of the branches, the fastening body being blind and opening upward, a fastening component with a tenon having a T-shaped transverse section able to penetrate and engage the C-shaped slideway and connected to the other one of the support for the individual and one of the branches, and a removable fastening device lock for locking the tenon in the slideway.

14. The assembly as claimed in claim 13, wherein the removable fastening device lock comprises:

a locking lever housed in a longitudinal axial recess of the tenon, the locking lever comprising:

a hook opening upward and articulated to a transverse boss projecting from the bottom of the recess of the tenon, and at least one central tooth projecting from face of the locking lever in a direction facing the slideway, the at least one tooth being able to penetrate an orifice located in the slideway, and a block of elastic material located between the locking lever and the recess of the tenon.

15. The assembly as claimed in claim 11, wherein a fastening body comprises a tab including a slideway secured to a lower slide, the lower slide being connected to one of the branches of the handle, the tab projecting into a gap between the two upright members of the carrying structure, and a tenon designed to engage the slideway secured to and projecting from the back of an adjustment member for the orientational adjustment of the support for the individual.

\* \* \* \* \*